Nov. 29, 1949 — A. J. BUTTERWORTH — 2,489,859
DIFFERENTIAL GEAR FOR MOTOR VEHICLES OR THE LIKE
Filed Aug. 31, 1945 — 2 Sheets-Sheet 1

Inventor:
Archibald James Butterworth
per Young Emery & Thompson
Attorneys.

Nov. 29, 1949 A. J. BUTTERWORTH 2,489,859
DIFFERENTIAL GEAR FOR MOTOR VEHICLES OR THE LIKE
Filed Aug. 31, 1945 2 Sheets-Sheet 2
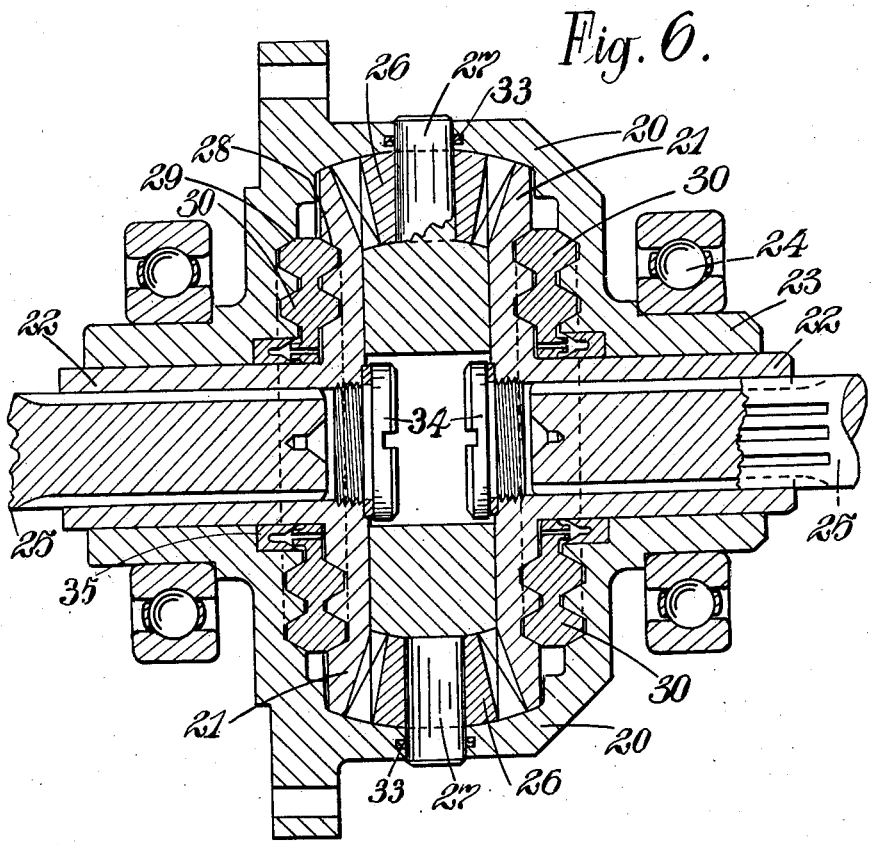
Fig. 6.
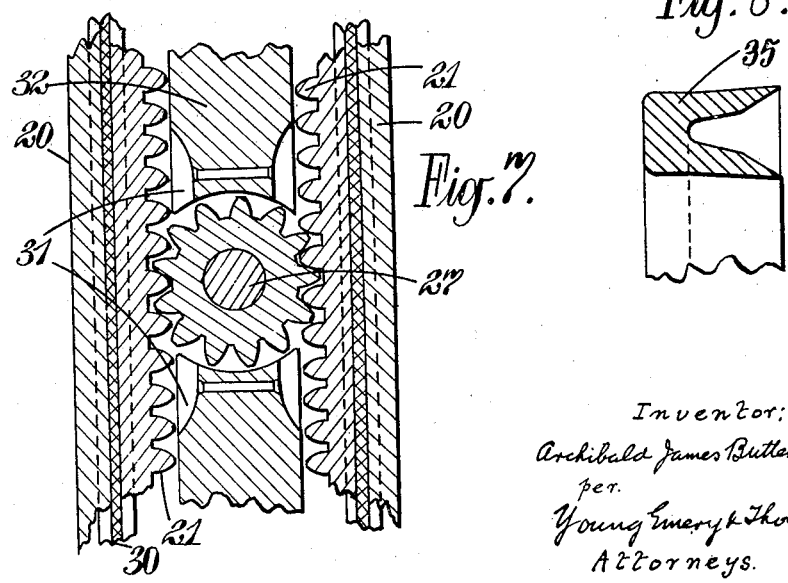
Fig. 7.
Fig. 8.
Inventor:
Archibald James Butterworth
per.
Young Emery & Thompson
Attorneys.

Patented Nov. 29, 1949

2,489,859

UNITED STATES PATENT OFFICE 2,489,859

DIFFERENTIAL GEAR FOR MOTOR
VEHICLES OR THE LIKE

Archibald James Butterworth,
Camberley, England

Application August 31, 1945, Serial No. 613,898
In Great Britain September 22, 1944

8 Claims. (Cl. 74—711)

This invention consists of improvements in or relating to differential gears for motor vehicles or the like. Considering the case of the back (driven) axle of a motor vehicle, the standard forms of differential gearing normally work satisfactorily when the vehicle is running on good road surfaces; but difficulties arise when one of the driven wheels reaches a place where it loses grip of the road surface and therefore speeds up, because the other driven wheel does not get adequate driving power, indeed it may get little or none, so that just at a time when the vehicle needs forward driving power (say to reach a proper road surface again) that power is lacking. Thus in the commonest form of differential gear the driving shaft (Cardan shaft) rotates a cage carrying planetary bevel pinions meshing with two bevel wheels secured respectively to the two driven shafts (e. g., the two parts of the back axle of a motor vehicle). Normally the two driven shafts are independent but the sum of their rotation rates bears a fixed relation to the rotation rate of the cage carrying the planetary bevel pinions, so that if one driven wheel gets into a greasy rut or on to a mudpatch and races, the other wheel loses torque partly or entirely.

The object of this invention is to provide simple means for overcoming the difficulty without any fundamental change in the power transmission.

According to this invention a differential gear is provided with a shroud or filling member closely approaching the teeth of the planet pinions and of the driven gear wheels but receding from them locally, so as to form a pocket or chamber adjacent to, and each side of, each meshing point of the planet pinions with the driven gear wheels. The gears are enclosed in a casing substantially oil-filled, so that when one driven gear wheel rotates in relation to the other, oil is pumped by the driving and driven gears, along the annular spaces swept by the gear teeth and enclosed by the shroud and the casing, into those pockets which the gear teeth are approaching, and away from those pockets or chambers from which the gear teeth are receding. These chambers can now be regarded as the suction and delivery zones of a gear-type oil pump, and if a sufficiently large orifice were provided between each such pair of chambers a substantially free circulation of oil would be set up as differential motion took place. Similarly, an orifice can be provided of such a size that, in conjunction with the leakage space necessarily provided by the ordinary manufacturing clearances between gears and shroud or casing, it will only permit substantially free circulation of oil at the low rates of differential motion between the driven gears—that is to say, up to about 15 revolutions per minute—which are required for the normal purpose of a vehicle differential gear. If then one driven gear is speeded up, as when a wheel loses grip on a slippery surface, considerable fluid frictional resistance will be encountered in forcing the more rapidly displaced oil through the available escape orifice and clearances, and a pressure will build up, increasing rapidly with differential speed, in order to overcome this resistance. This pressure will act as a resistance to free rotation of the driven gear and the wheel which had temporarily lost grip on the road, and so permit the drive to be maintained to the other driven gear and its corresponding road wheel.

The word oil in this specification is intended to include not only ordinary lubricating oils but also grease and other suitable fluids.

Thus when this invention is applied to a differential gear of the well-known bevel-wheel and planetary bevel pinion type, the cage carrying the planetary bevel pinions may also carry a shroud or filling member lying between the driven bevel wheels and closely approaching the gear teeth but leaving pockets in the vicinity of the meshing points of the gear wheels with the planet pinions and the differential gear is enclosed in a casing substantially oil-filled so that if one driven bevel wheel speeds up (owing to the slipping of the corresponding road wheel) the planetary pinions are caused to pump oil through the restricted spaces between the shrouds and the gear teeth and not only is the speeding up of the faster bevel wheel checked but the slower bevel wheel receives an adequate share of the driving power applied to the cage.

It may be desirable to develop a very high torque resistance to differential movement of the driven bevel gear wheels (without developing a correspondingly high pressure in the oil or other fluid with which the gear casing is filled) and one feature of the present invention consists in providing a mechanical brake which may be operated by the pressure developed at the meshing points of the gears on differential movement so that a frictional resistance is created to said differential movement in addition to the hydraulic resistance already present.

In a preferred form of the invention the driven gear wheels are capable of slight axial movement in relation to the driven shafts and the gear casing (which casing is part of the planet carrier) and braking members are provided between the outside radial face of each driven gear wheel and the corresponding inner radial face of the gear casing so that fluid pressure developed at the meshing point of the gears (e. g. during excessive differential movement) produces a frictional resistance to said differential movement.

The clearances between the shroud and the gear teeth may provide adequate oil escape or a definite oil-escape orifice may be provided in the shroud and this may be adjustable (say by a screw). The gear casing may either be filled with oil and provided with sealing means to prevent leaking of oil or may be supplied with oil from the back-axle sump and this supply may be effected by the pumping action above referred to. The oil may be sucked in through a non-return valve (conveniently a lightly spring-loaded disc valve). In this case the control orifice would pass oil back to the oil sump.

The nature of this invention and of subsidiary features will be appreciated from the following description of two examples, reference being made to the accompanying drawings:

Figure 6 is a central sectional elevation of a modified form of differential gear according to the invention;

Figure 7 is a projected or developed view of the gears, shroud, friction members and casing shown in Figure 6.

Figure 8 is a detail section of a sealing ring.

Figure 1:
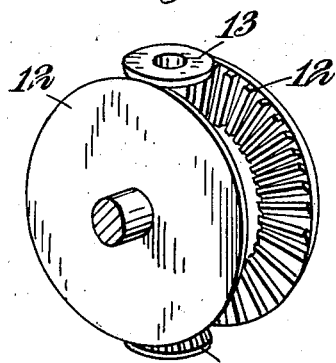
Figure 1 is a perspective view.
Figure 2:
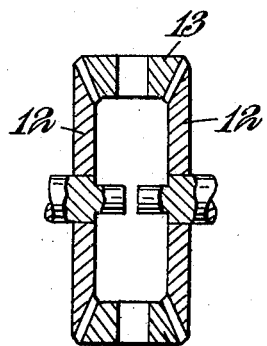
Figure 2 is a central vertical section of a standard differential gear of the bevel type (the bevel gears only)

Referring to Figures 1 and 2, the driven bevel wheels 12 are in constant mesh with the planetary bevel pinions 13 which are carried on a cage (not shown).

Figure 3:
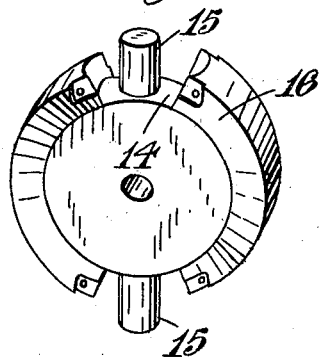
Figure 3 is a perspective view.
Figure 4:
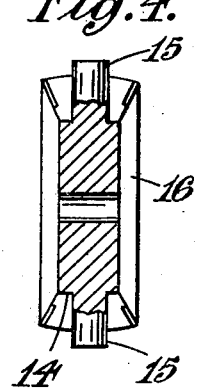
Figure 4 is a central vertical section of the cage for the planetary bevel pinions with the shrouds thereon.

Referring to Figures 3 and 4, the cage 14 carries the spindles 15 for the planetary bevel pinions and also carries shrouds 16 shaped to approach closely to the teeth of the various gears. The gears are as usual enclosed in a casing (not shown) filled with oil.

Figure 5:
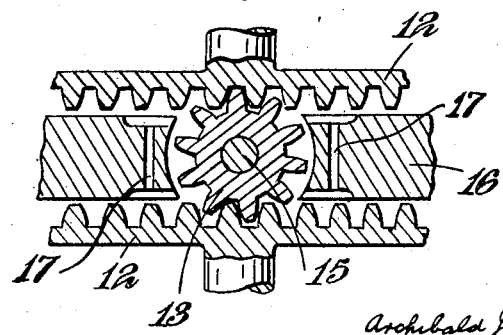
Figure 5 is a projected or developed view of a planetary bevel pinion, the teeth of the driven bevel wheels and the shrouds.

Referring to the development shown in Figure 5, the driven bevel wheels 12 and the planetary bevel pinions 13 are shown in relation to the shrouds 16, a clearance being provided at the points of contact, and it will be readily seen that if while drive is imparted as usual from pinions 13 to the wheels 12 in one direction one of the wheels 12 lost its load and tended to race away the pump action above referred to would provide a load and enable the pinions 13 to continue to impart a forward drive to the wheel 12 which is not slipping. In Figure 5 oil escape orifices 17 are shown but adjusting screws therefor are not shown. These orifices 17 are so proportioned and adjusted that at low differential speeds of the gear wheels 12, when the oil flow across the meshing points is slow, they present substantial zero frictional resistance to the oil and permit a free circulation of the oil between clearances 16a at either side of each meshing point. However, when the differential speed of the gear wheels 12 is high and the flow past the meshing points is fast, the orifices present a considerable fluid frictional resistance to the oil, with a resultant build up of pressure on the delivery side of each meshing point.

Referring to Figures 6 and 7 the gear casing 20 is conveniently in two halves. The driven bevel wheels 21 have short annular shafts 22 journalled in sleeves 23 projecting axially from the casing 20 (which itself is driven in any usual way and runs on bearings 24). The bevel wheels 21 are capable of slight axial movement in relation to casing 20 and each annular shaft 22 is splined as shown to the corresponding half axle 25. The planet pinions 26 are journalled on spindles 27 which engage in bores in casing 20. The outside radial face of each bevel wheel 21 has annular V-shaped grooves 28 and the inside annular faces of the casing have correspondingly grooves 29 into which grooves fit corresponding ridges formed on both faces of the friction discs 30 which may be of compressed fibre or similar oil-resisting material. On differential action taking place pressure is developed on one side of each meshing point in the zones 31 of the shroud 32 as explained above. This pressure thrusts the bevel wheels 21 outwards and so forces the ridges on the friction discs 30 into the grooves 28, 29 causing a frictional resistance to relative motion between the bevel wheels 21 and the casing 20.

Turning now to the sealing devices and referring to Figures 6 and 8, the two halves of the casing 20 may be effectively joined by the use of a jointing compound but their joining faces may be recessed to receive a moulded plastic ring. Again the spindles 27 of the planet pinions 26 may be held fluid tight in the casing 20 by moulded plastic rings 33 lying in recesses in the casing 20.

Leakage past the half axles 25 where they are splined is prevented by closing the inner ends of the annular shafts 22 by plugs 34 which are removable to permit the driving out of a broken half-axle if necessary.

Leakage between the outside diameter of the annular shaft 22 of the bevel wheel 21 and the corresponding sleeve 23 of the differential casing is prevented by boring a recess in the casing into which is fitted the fibre sealing member 35, which may be retained in position by a ring which may form part of the friction disc 30. The sealing member 35 is made in the form shown in Figure 8, being deeply grooved on the inner sides so as to be self-expanding under pressure. The legs of the U-shape thus formed are tapered slightly to give an interference fit on the inner and outer diameters, and so provide a seal under the normal condition of no pressure. It will be appreciated that the zones 31 under pressure will be confined to the immediate vicinity of the meshing points.

The applications of this invention are—

(1) Preventing loss of traction through wheel spin on all wheeled cross-country vehicles, tractors, and racing and other automobiles;

(2) Preventing propeller-shaft "wind-up" on four-wheel drive vehicles (controlled differential being interposed between front and rear axle drives).

It will be understood that the method proposed is to shroud the tooth crests of the differential bevels of a standard type back axle, the differential housing being at the same time sealed and filled with oil, grease or other suitable fluid.

The paths swept by the bevel teeth between their points of meshing are thus converted into oil-galleries of conoidal annular shape along which during relative movement of the bevels oil is carried by the gear teeth, acting as pistons, from the disengaging side of one meshing point towards the engaging side of the next. If no leakage took place and no transfer of oil from each engaging side to a disengaging side was permitted, the differential would be locked, assuming the oil to be incompressible.

In practice, the ordinary machining clearances will permit a certain amount of leakage.

The maximum differential speed to be catered for is the difference of wheel speeds obtaining when the vehicle is taking any given corner just below the skidding point, and if we assume μ for rubber to road surface to be unity, this can easily be calculated.

A suitable value for resistance to differential movement at this speed being decided upon (say 20 ft. lb. or the effort easily exerted to turn one wheel relative to the other by hand with one wheel jacked up), the gear can be regulated by adjusting the size of orifices.

It is anticipated that in production a suitable size of plain drilled hole would be arrived at, and the needle valves dispensed with, as the adjustment is not critical.

If now the grip of one wheel is lost either through running on to a loose or greasy surface, or through being thrown clear of the ground at speed, it can only accelerate to a speed relative to the speed of the other wheel, at which the differential torque is equal to the torque being transmitted to the other wheel. The vehicle will continue to be driven at full torque, therefore, as long as either wheel can find a grip. Further, in the case of wheel lift at speed, the affected wheel will not be able to speed up nearly as quickly as with a free differential, so reducing tire abrasion when the affected wheel regains contact with the road, and improving directional stability.

These results are obtained without any detriment to the normal action of the differential on cornering, and with no additional stresses being applied to the half shafts, such as occur when locking or semi-locking differentials are employed.

Finally this invention can be incorporated in a standard back axle without disturbing production appreciably, as it is only necessary to introduce one new part—the shroud—in place of the existing bevel pinion cage or spider and to make detail modifications to the housing to permit sealing. No strengthening up of half-shafts, splines or key-ways is necessary.

I claim:

1. A differential gear comprising a pair of driven gear wheels, planet pinions meshing with both of said gear wheels, a shroud member closely approaching the teeth of the planet pinions and of the driven gear wheels around their circumference but leaving pockets in the vicinity of the meshing points of the gear wheels with the planet pinions, a substantially oil filled casing enclosing said gear wheels and pinions, and means for driving said casing and pinions so that when one driven gear wheel rotates in relation to the other, the oil is pumped by the driving pinions and driven gears and between the shroud and the gear teeth so as to apply a fluid resistance to rotation of the faster driven gear wheel which resistance increases rapidly with the difference in speed of the driven gear wheels and enables the slower driven gear wheel to receive an adequate share of driving power.

2. A differential gear comprising a pair of axially aligned and spaced driven bevel gear wheels, a plurality of bevel planet pinions interposed between and meshing with said gear wheels, a cage carrying said pinions, a shroud member carried by said cage closely approaching the teeth of the planet pinions and of the driven gear wheels around their circumference but leaving pockets in the vicinity of the meshing points of the gear wheels with the planet pinions, a substantially oil filled casing enclosing said gear wheels and pinions, and means for driving said casing and pinions so that if one driven bevel wheel speeds up due to reduction of load thereon, the planetary pinions are caused to pump oil through the restricted spaces between the shrouds and the gear teeth and not only is the speeding up of the faster bevel wheel checked, but the slower bevel wheel receives an adequate share of the driving power applied to the cage.

3. A differential gear comprising a pair of driven gear wheels, planet pinions meshing with both of said gear wheels, a shroud member closely approaching the teeth of the planet pinions and of the driven gear wheels around their circumference but leaving pockets in the vicinity of the meshing points of the gear wheels with the planet pinions, a substantially oil filled casing enclosing said gear wheels and pinions, and means so that when one driven gear wheel rotates in relation to the other, the oil is pumped by the driving pinions and driven gears and between the shroud and the gear teeth so as to apply a fluid resistance to rotation of the faster driven gear wheel which resistance increases rapidly with the difference in speed of the driven gear wheels and enables the slower driven gear wheel to receive an adequate share of driving power, and fluid pressure actuated friction clutch means interposed between said gear wheels and casing and operable by oil pressure generated by relative movement between said pinions and gear wheels.

4. A differential gear comprising a pair of axially aligned and spaced driven bevel gear wheels, a plurality of bevel planet pinions interposed between and meshing with said gear wheels, a cage carrying said pinions, a shroud member carried by said cage closely approaching the teeth of the planet pinions and of the driven gear wheels around their circumference but leaving pockets in the vicinity of the meshing points of the gear wheels with the planet pinions, a substantially oil filled casing enclosing said gear wheels and pinions, and means for driving said casing and pinions so that if one driven bevel wheel speeds up due to reduction of load thereon, the planetary pinions are caused to pump oil through the restricted spaces between the shrouds and the gear teeth and not only is the speeding up of the faster bevel wheel checked, but the slower bevel wheel receives an adequate share of the driving power applied to the cage, and fluid pressure actuated friction clutch means interposed between said gear wheels and casing and operable by oil pressure generated by relative movement between said pinions and gear wheels.

5. A differential gear comprising a pair of axially aligned and spaced driven bevel gear wheels, a plurality of bevel planet pinions interposed between and meshing with said gear wheels, a cage carrying said pinions, a shroud member carried by said cage closely approaching the teeth of the planet pinions and of the driven gear wheels around their circumference but leaving pockets in the vicinity of the meshing points of the gear wheels with the planet pinions, a substantially oil filled casing enclosing said gear wheels and pinions, and means for driving said casing and pinions, so that if one driven bevel wheel speeds up due to reduction of load thereon, the planetary pinions are caused to pump oil through the restricted spaces between the shrouds and the gear teeth and not only is the speeding up of the faster bevel wheel checked, but the slower bevel wheel receives an adequate share of the driving power applied to the cage, said casing being part of the cage, said driven gear wheels being capable of slight axial movement in relation to the driven shafts and the gear casing and clutch members between the outside radial face of each driven gear wheel and the corresponding inner radial face of the gear casing so that fluid pressure developed at the meshing point of the gears during excessive differential movement produces frictional resistance between said gear wheels and casing.

6. A differential gear comprising a pair of driven gear wheels, planet pinions meshing with both of said gear wheels, a shroud member closely approaching the teeth of the planet pinions and of the driven gear wheels around their circumference but leaving pockets in the vicinity of the meshing points of the gear wheels with the planet pinions, a substantially oil filled casing enclosing said gear wheels and pinions, and means for driving said casing and pinions so that when one driven gear wheel rotates in relation to the other, the oil is pumped by the driving pinions and driven gears and between the shroud and the gear teeth so as to apply a fluid resistance to rotation of the faster driven gear wheel which resistance increases rapidly with the difference in speed of the driven gear wheels and enables the slower driven gear wheel to receive an adequate share of driving power, and fluid actuated mechanical locking means for locking the gear wheels against differential movement and whereby the fluid pressure developed at the meshing points of the gears on differential movement actuates said mechanical locking means on reaching a predetermined value, to arrest differential movement during engagement and is automatically disengaged when the said fluid pressure falls below a predetermined value.

7. A differential gear according to claim 1, wherein the oil escape constituted by the clearances between the shroud member and the gear teeth is supplemented by an adjustable oil escape orifice.

8. A differential gear according to claim 1, wherein the gear casing is provided with sealing means to prevent leakage of oil.

ARCHIBALD JAMES BUTTERWORTH.

REFERENCES CITED

The following references are of record in the file of this patent:

UNITED STATES PATENTS

| Number | Name | Date |
|---|---|---|
| 1,266,712 | Reagan | May 21, 1918 |
| 1,277,837 | Bilgram | Sept. 3, 1918 |
| 1,324,858 | Taylor | Dec. 16, 1919 |
| 1,750,981 | Wildhaber | Mar. 18, 1930 |
| 1,916,715 | Corey | July 4, 1933 |
| 2,267,362 | Ash | Dec. 23, 1941 |